United States Patent [19]

McCormack

[11] Patent Number: 5,265,192
[45] Date of Patent: Nov. 23, 1993

[54] METHOD FOR THE AUTOMATED EDITING OF SEISMIC TRACES USING AN ADAPTIVE NETWORK

[75] Inventor: Michael D. McCormack, Plano, Tex.

[73] Assignee: Atlantic Richfield Company, Los Angeles, Calif.

[21] Appl. No.: 585,861

[22] Filed: Sep. 20, 1990

[51] Int. Cl.$^5$ .................. G06F 15/18; G06F 15/00; G06F 15/58
[52] U.S. Cl. ........................ 395/22; 395/21; 395/24; 364/421
[58] Field of Search ............... 364/420, 421, 422; 395/21, 22, 23, 24, 25; 382/15

[56] References Cited

U.S. PATENT DOCUMENTS 5,150,323  9/1992  Castelaz ..................... 395/24

OTHER PUBLICATIONS

Neff, et al., "Noise Suppression by the Radial Amplitude-Slope Rejection Method", *Geophysics*, vol. 51, No. 3 (Mar. 1986), pp. 844–850.
Anderson, et al., "Automatic Editing of Noisy Seismic Data", *Geophysical Prospecting 37* (1989), pp. 875–892.
Wasserman, et al., "Neural Networks, Part 1", *IEEE Expert* (1987), pp. 10–14.
Wasserman, et al., "Neural Networks, Part 2", *IEEE Expert* (1988), pp. 10–15.
Lippmann, "An Introduction to Computing with Neural Nets", *IEEE ASSP Magazine* (Apr. 1987), pp. 4–24.
Caudill, "Neural Networks Primer, Part I", *AI Expert* (Dec. 1987), pp. 46–55.
Caudill, "Neural Networks Primer, Part II", *AI Expert* (Feb. 1988), pp. 55–67.
Caudill, "Neural Networks Primer, Part III", *AI Expert* (Jun. 1988), pp. 53–65.

*Primary Examiner*—Roy N. Envall, Jr.
*Assistant Examiner*—Khat Tran
*Attorney, Agent, or Firm*—Vinson & Elkins

[57] ABSTRACT

An adaptive, or neural, network and a method of operating the same is disclosed which is particularly adapted for performing seismic trace editing for seismic shot records. The adaptive network is first trained according to the generalized delta rule. The disclosed training method includes backpropagation is performed according to the worst case error trace, including adjustment of the learning and momentum factors to increase as the worst case error decreases. Slow convergence regions are detected, and methods applied to escape such regions including restoration of previously trimmed dormant links, renormalization of the weighting factor values, and the addition of new network layers with links between nodes that skip the hidden layer. After the training of the network, data corresponding to a Discrete Fast Fourier Transform of each trace, and to certain other attributes of the trace and adjacent traces thereto, are presented to the network. The network classifies the trace as good or noisy according to the inputs thereto, and to the weighting factors therewithin, such classification useful for ignoring noisy traces in subsequent data analysis. The analysis may be repeated for all of the traces in the shot record, and in multiple shot records.

20 Claims, 6 Drawing Sheets

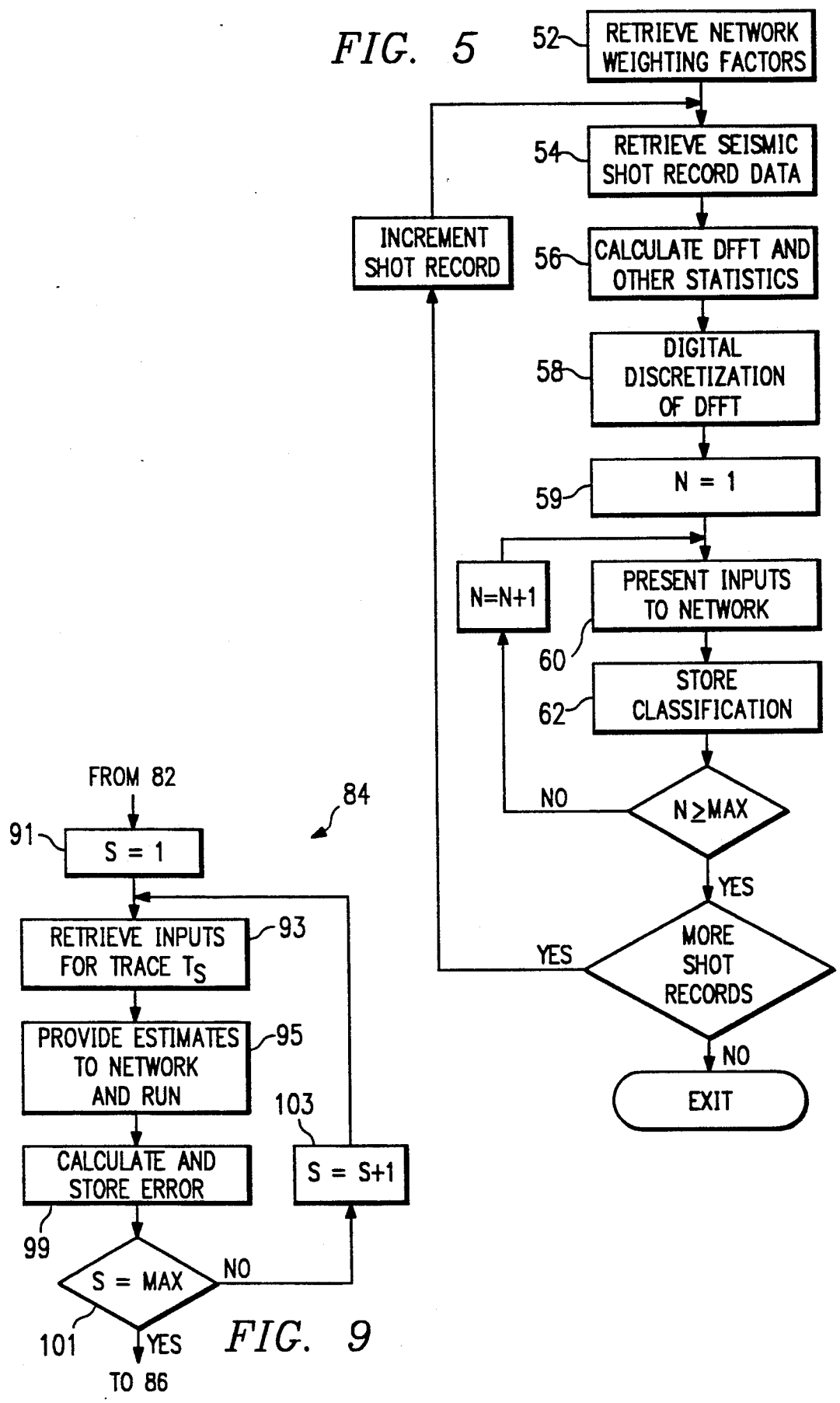

METHOD FOR THE AUTOMATED EDITING OF SEISMIC TRACES USING AN ADAPTIVE NETWORK

This invention is in the field of seismic prospecting, and is specifically directed to automated seismic data processing in such prospecting.

This application is related to application Ser. No. 07/585,967, filed Sep. 20, 1990, assigned to Atlantic Richfield Company, and incorporated herein by this reference.

BACKGROUND OF THE INVENTION

The prospecting for underground oil and gas reservoirs is often performed by the use of seismic vibrations and waves which are intentionally input into the earth at a source location, and which are detected at remote locations by geophones (in the case of prospecting on land) or hydrophones (for offshore prospecting). The travel times of vibrations from the source to the detection locations is indicative of the depth of various geological features such as interfaces between sub-surface strata, and the presence of hydrocarbon reservoirs thereat, from which the seismic waves reflect.

In the field application of such prospecting, however, the detected vibrations generally include not only the reflected vibrations generated by the seismic source (i.e., the "signal"), but also often include vibrations from other sources which are not relevant to the seismic exploration (i.e., the "noise"). The sources of noise vibrations, examples of which include wind noise, electrical noise such as from nearby power lines, and cultural noises such as from automobile and cattle traffic, are quite numerous and varied. Accordingly, the cumulative noise generated by these various noise sources will include both organized (e.g., periodic) and random components, not only as a function of time (and frequency), but also which are spatially dependent, according to the type and position of the sources and the detectors.

The presence of noise vibrations detected with the signal vibrations makes seismic analysis more difficult, and accordingly less accurate. The problem of noise vibrations becomes more acute with the extremely low power of signal vibrations as they are reflected from very deep geological formations. Due to the wide variation in noise sources, both organized (e.g., periodic) and random (e.g., non-periodic or impulse) noise components, mere filtering of the detected vibrations will generally not result in an adequate seismic survey.

A conventional method for dealing with noisy seismic traces in a seismic shot record or seismic survey is the visual inspection of each shot record, followed by deletion of each seismic trace (i.e., time series of detected vibrations from one surface location for one seismic input) from the record prior to its analysis. This method is currently performed by a human operator at a computer workstation, where the shot record is displayed graphically and the operator identifies noisy traces using a mouse and cursor system. Since conventional shot records often include on the order of 100 traces each, and since conventional seismic surveys often include tens or hundreds of shot records, this manual editing is heavily labor intensive and is quite slow. Furthermore, such editing of noisy seismic traces is performed according to the subjective criteria of the individual operator, so that both the discarding of traces with valid data and the retention of noisy traces with limited useful data can often result. The seismic analysis performed on such an erroneously edited shot record is thus less accurate, as well as being quite expensive due to the large amount of skilled labor involved.

It is therefore quite apparent that automation of the seismic trace editing process is desirable. Various techniques have been proposed for the automation of editing large numbers of seismic traces. Examples of these techniques are described in Neff et al., "Noise suppression by the radial amplitude-slope rejection method", *Geophysics*, Vol. 51, No. 3 (March, 1986), pp.844–850; and Anderson et al., "Automatic Editing of Noisy Seismic Data", *Geophysical Prospecting* 36 (1989), pp. 875–892. These prior techniques have been based on statistical and mathematical attributes of the seismic signals, for example analyzing relative amplitude decay rates, or analyzing a combination of the amplitude and slope of such signals. However, due to variations in the nature of the noise sources and noise vibrations along the seismic profile and to other factors, it is questionable whether the reliability of these techniques is sufficient to allow significant reductions in cost and error over the purely manual process described hereinabove.

It is therefore an object of this invention to provide a method for automated seismic trace editing which uses an adaptive computer network such as a neural network.

Neural networks refer to a class of computations that can be implemented in computing hardware, or more frequently computer programs implemented on conventional computing hardware, organized according to what is currently believed to be the architecture of biological neurological systems. The distinguishing feature of neural networks is that they are arranged into a network of elements, mimicking neurodes of a human brain. In such networks, each element performs a relatively simple calculation, such as a weighted sum of its inputs applied to a non-linear function, such as a sigmoid, to determine the state of the output. Increased power of computation comes from having a large number of such elements interconnected to one another, resulting in a network having both parallel and sequential arrangements of computational elements. Proper setting of the weighting factors for each of the elements allows the network to perform complex functions such as image recognition, solving optimization problems, and the like.

The programming of conventional computer systems to operate as an artificial neural network is well known in the art, as described in Y. H. Pao, *Adaptive Pattern Recognition and Neural Networks*, (Addison-Wesley Publishing Company, New York, 1989), incorporated herein by this reference. As described therein, such programming can be done in high level languages such as C.

A particular type of neural network which is of interest is referred to as the backpropagation network. Such a network generally includes multiple layers of elements as described above. Adaptation of the network to a particular task is done by way of "training" the network with a number of examples, setting the weighting factors for each element to the proper value. This training is accomplished by presenting inputs to the network, analyzing the output of the network, and adjusting the weighting factors according to the difference between the actual output and the desired output for the training example. Upon sufficient training, the network is adapted to respond to new inputs (for which the answer is not known a priori), by generating an output which is similar to the result which a human expert would present for the same inputs. An example of a conventional backpropagation algorithm for training a neural network of this type is described in Rumelhart et al., *Parallel Distributed Processing* (The MIT Press, Cambridge, Mass., 1988), incorporated herein by this reference.

It is therefore a further object of this invention to provide a neural network which is adapted to perform classification of valid and noisy seismic traces in a seismic survey, so that the noisy traces can be deleted from further analysis.

It is a further object of this invention to provide a neural network which performs such classification of seismic traces using both graphical data from the amplitude spectrum in the frequency domain and also information concerning particular attributes of the trace.

Other objects and advantages of the invention will be apparent to those of ordinary skill in the art having reference to the following specification in combination with the drawings.

SUMMARY OF THE INVENTION

The invention may be incorporated into a computer system programmed to operate as a neural, or adaptive, network, and which includes stored seismic trace data. The network, once trained, is provided with inputs corresponding to both a graphical representation of the trace, for example the amplitude spectrum in the frequency domain, and also corresponding to one or more attributes of the seismic trace. In addition, inputs corresponding to neighboring traces may also be presented to the network. The network classifies the trace according to two outputs, a first output indicating that the trace is acceptable, and the other indicating that the trace is excessively noisy, and should be ignored in subsequent seismic processing. The network may then operate on successive traces in the shot record, resulting in the automated editing of the shot record, and the entire seismic survey, in the same manner.

BRIEF DESCRIPTION OF THE DRAWINGS

FIG. 5 is a flow diagram of a method of seismic trace editing using an adaptive network according to the preferred embodiment of the invention.

FIG. 9 is a flow diagram of a portion of the method of FIG. 8 in which sample traces are run.

DETAILED DESCRIPTION OF THE PREFERRED EMBODIMENT

Seismic Data Acquisition and Analysis

Figure 1:
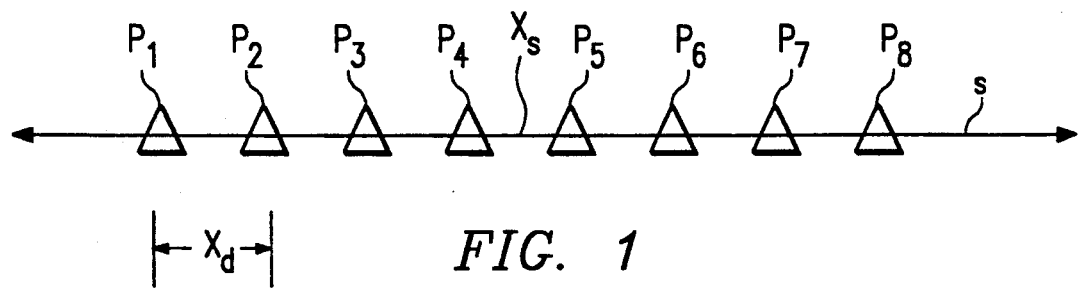
FIG. 1 is schematic diagram of a conventional 2-D seismic survey, illustrating a conventional arrangement of detectors relative to a surface seismic source.

FIG. 1 schematically illustrates a conventional two-dimensional seismic survey arrangement, for the example of a land survey taken at the surface S. The location $X_s$ indicates the location of a seismic source, either a pulse source such as dynamite or a conventional "thumper", or an upsweep or downsweep wave generator such as is used in Vibroseis ® (Trademark of Continental Oil Company) surveying. A number of geophone groups P1 through P8 are shown in FIG. 1 as located along a line which includes the location $X_s$ of the source. As is well known in the art, a geophone group conventionally consists of a single geophone, or of multiple geophones near the same location whose electrical output signals are electronically summed together. Geophone groups P are generally evenly spaced from one another by a distance $X_d$, which is conventionally on the order of 100 feet. As is well known in the art of seismic exploration, geophone groups P will detect vibrations generated by the source at location $X_s$ and reflected from sub-surface strata. The detected vibrations are stored and displayed for each geophone group P, with the time domain display of the detected vibrations from a single geophone group P commonly referred to as a seismic trace. It should be noted that while only eight geophone groups P are shown in FIG. 1, conventional two-dimensional seismic surveying may use from ninety-six to one thousand geophone groups P in the line. The set of traces received responsive to source vibrations from a single source location is generally referred to as a shot record.

After the source has provided vibrations from location $X_s$, and after geophone groups P have detected the vibrations and stored a representation of the same (generally by transmitting signals to a recording station located in the field), the location of the source is moved, generally by the distance $X_d$ to between the next two geophone groups P. Referring to FIG. 1, the next location of the source would be between geophone groups P5 and P6. Geophone group P1 will be moved to the other end of the line, for example to a location which is a distance $X_d$ on the other side of geophone group P8 from geophone group P7. Another shot record is taken with the source at this new location. The set of shot records taken by the iterative moving of the source is commonly referred to as the seismic line, or seismic survey. By conventional data processing, such as common depth point (CDP) or common midpoint (CMP) stacking, information about the underlying geological formations can be determined from the resulting seismic line or survey. The data from the seismic survey is generally stored, and may be reanalyzed at a later time.

Figure 2:
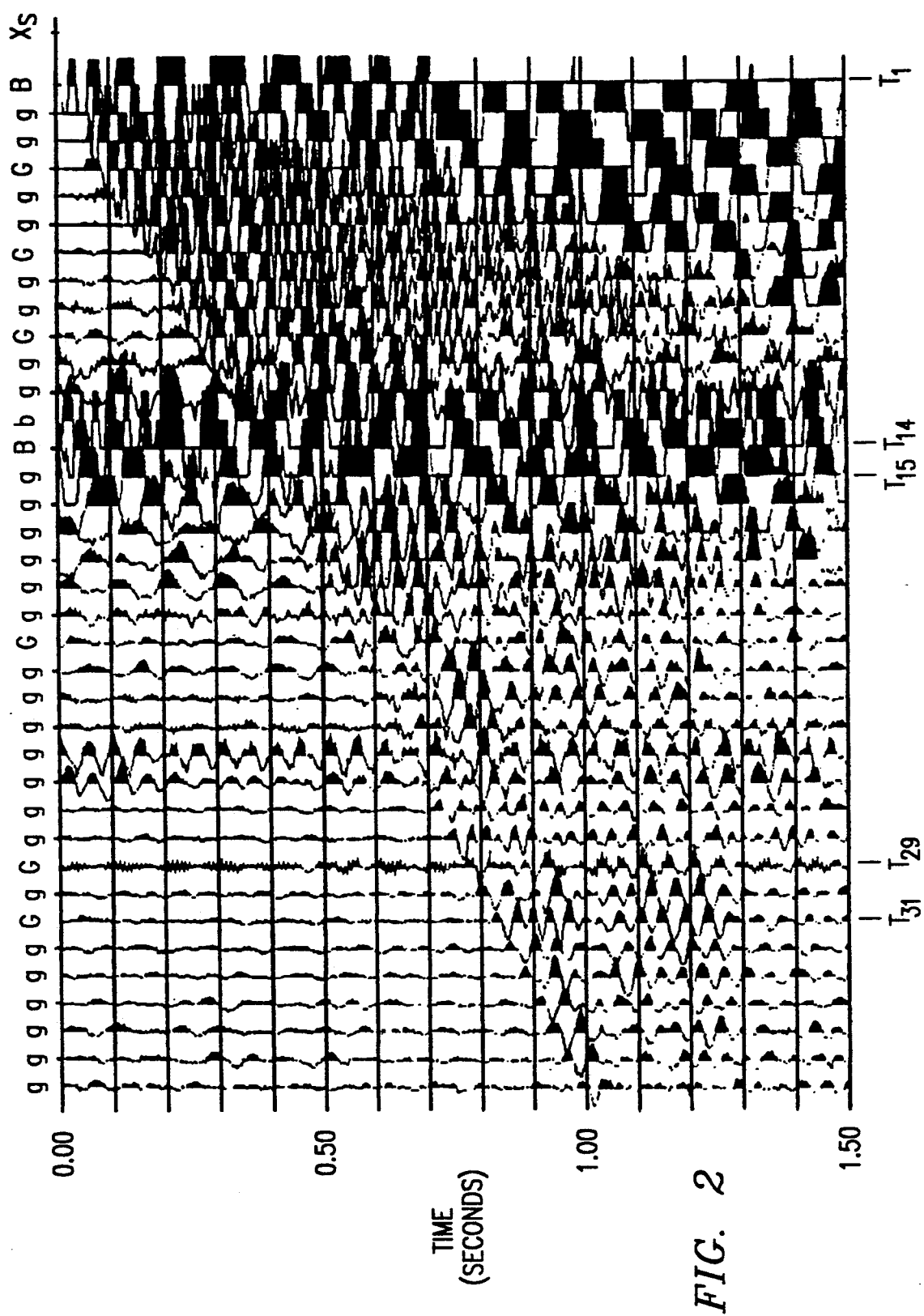
FIG. 2 is an example of a shot record according to a common source gather.

FIG. 2 is a typical seismic shot record of traces 10 from a number of geophone groups P, arranged in the conventional manner with the time axis vertical, and with the distance axis horizontal. In the example of FIG. 2, the source location $X_s$ is at the top right of the record. As is evident from FIG. 2, the greater the distance from the source location $X_s$ to the geophone group P for a particular trace, the later that vibrations are detected at the geophone group. It should be noted that the traces T of FIG. 2 are numbered by subscripts, with trace $T_1$ being the trace from the geophone group P closest to the source location $X_s$.

In the shot record of FIG. 2, some of the traces include noise having such amplitude and frequency as to render the trace unusable for seismic interpretation; other traces have minimal noise, or have noise of such character that analysis of the trace will provide useful information. Referring to FIG. 2, trace $T_{31}$ is an example of a seismic trace which has minimal noise present, and which would provide usable seismic data. Trace $T_{29}$ includes some amount of high frequency noise, which is especially apparent in the portion with time t below 0.80 seconds as compared with neighboring traces. It should be noted that trace 12 still behaves similarly as its neighboring traces, and will provide useful seismic information, especially if the high frequency noise is filtered therefrom (as can be done according to conventional digital filtering techniques performed prior to the analysis of the seismic survey).

As is apparent from a comparison of trace 14 with other traces, trace $T_{14}$ includes high amplitude noise of a frequency near that of the seismic signal, over the entire time period of interest from time 0.00 seconds to 1.50 seconds. By comparison with the other traces, one of ordinary skill in the art would recognize that trace $T_{14}$ does not include seismic signal information of an amount sufficient to be useful in seismic prospecting. Similarly, trace $T_1$ includes high amplitude low frequency noise for time near 0.00 seconds, and no information for times past 0.80 seconds; accordingly, trace $T_1$ does not provide useful information (as is often the case for the geophone group located closest to the source location $X_s$).

Seismic noise such as is present on some of the traces of the shot record of FIG. 2 is generated by various physical sources, such various sources providing noise of various types. For example, coherent noise (i.e., noise that is organized, predictable or repetitive in pattern) may be generated by the source itself and transmitted to the geophone groups as refractions or diffractions of the source seismic input; an example of such noise is commonly referred to as source-generated groundroll, which is the most common and highest energy noise present in many seismic surveys. Other coherent noise includes that generated by nearby power lines (e.g., 60 Hz "hum"). Disorganized and non-periodic noise includes wind noise, and such noise as generated by animal and vehicle traffic. In addition, both types of noise may be present for all geophone groups, or may be spatially random, appearing at only certain ones of geophone groups.

Certain noise reduction techniques, such as filtering, are conventionally applied to the seismic traces, either in the detection and sampling of the vibrations, or alternatively in the analysis of the date. In many cases, however, such filtering is inadequate to remove certain types of noise, particularly where the noise is of relatively high amplitude compared to the seismic signal, and at approximately the same frequencies. Those seismic traces having excessive and non-filterable noise must be removed from subsequent analysis, or else the results of the seismic survey may be incorrect. Such subsequent analysis is performed according to conventional seismic data processing techniques as deconvolution, cross-correlation, normal move-out (NMO) correction and stacking, and the like.

Prior techniques for identifying excessively noisy seismic traces have generally been labor-intensive, requiring a skilled operator to review each seismic trace in each shot record of the survey, and to identify the noisy traces and to delete or ignore such traces in subsequent analysis. Even with the advent of high-speed computing technology, seismic trace editing still requires an operator to review each shot record to identify and delete the noisy traces, for example by moving a cursor on the display to each trace which is excessively noisy and by then indicating to the computer that the trace is to be deleted. Besides the high costs of labor for such editing, the standards for calling a trace noisy present the possibility of error, and also result in the editing of many shot records to be inconsistent, as depending upon the subjective standards applied by different operators.

As noted hereinabove, the present invention is intended to provide an automated method for accurate seismic trace editing, by way of using an adaptive network such as a neural network. While FIG. 2 illustrates a conventional two-dimensional shot record, toward which the description herein is directed, the instant invention is intended to be equivalently applicable to other types of seismic surveys, such as, for example, three-dimensional surveys.

Neural Network Architecture

A class of computing techniques commonly referred to as adaptive, or neural, networks have been used, as noted hereinabove, for the solution of certain types of problems. These neural networks are commonly implemented by computer programs operating on conventional computing equipment; it should be noted, however, that special dedicated hardware for the implementation of neural networks has been constructed. As will be described hereinbelow, the preferred embodiment of this invention utilizes a neural network technique for the automation of the seismic trace editing process, and provides significant labor savings over the manual operation.

Figure 3:
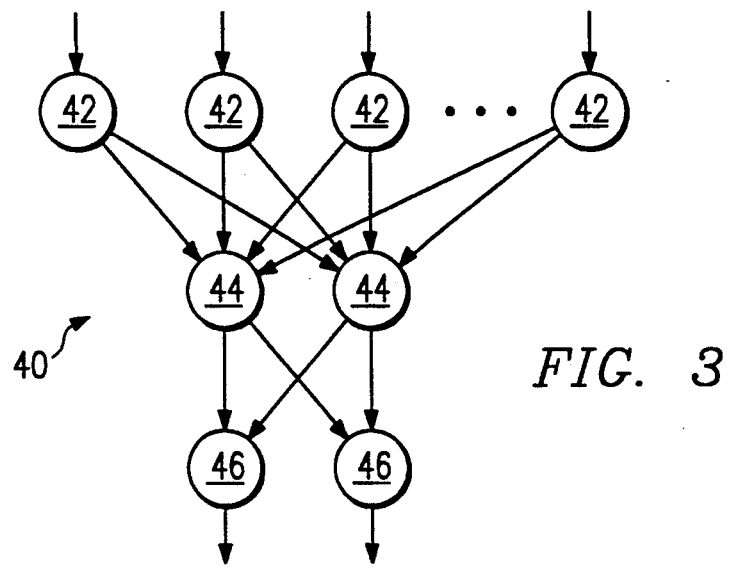
FIG. 3 is a representational diagram of a conventional neural network.

Referring now to FIG. 3, a conventional backpropagation neural network 40 is schematically illustrated. As noted above, neural network 40 is generally implemented in a computer program on conventional computer hardware, for example a DEC Workstation 3100 or other similar computer, programmed in a high level language such as FORTRAN. Such programming, using high level languages, of conventional computer systems to operate as an artificial neural network is well known in the art, as described, for example, in Y. H. Pao, *Adaptive Pattern Recognition and Neural Networks*, cited hereinabove and incorporated herein by reference. Accordingly, for such a software implementation, the network 40 of FIG. 3 is a representation of the operation of the computer program; such representation for computer programs of this type is conventional and well-known in the art.

Network 40 includes three layers of nodes 42, 44 and 46, arranged in layers. The layer of nodes 42, each receiving an input to network 40, is referred to as the input layer; conversely, the layer of nodes 46, presenting outputs from network 40, is referred to as the output layer. The layer of nodes 44, each of which receives inputs from input nodes 42, and presents an output to output nodes 46, is commonly referred to as a middle, or hidden, layer. While a single hidden layer is illustrated in FIG. 3, it should be noted that conventional networks may include multiple hidden layers between the layer of input nodes 42 and the layer of output nodes 46.

Conventional problems solved by network 40 include the classification of an input into one of several classes; generally output nodes 46 each are associated with a class, so that a single one of output nodes 46 will, for each set of inputs to network 40, indicate that the input set belongs to its corresponding class. The problem of seismic trace editing described hereinabove is an example of such a classification problem. It should be noted that simple neural networks may be constructed (or programmed, as the case may be) without a hidden layer of nodes 44, or even with a single layer of nodes 42, depending on the simplicity of the classification or other type of problem to be solved. The provision of a hidden layer of nodes 44 such as network 40 of FIG. 3 allows for the solution of a classification problem, for example, having arbitrary and complex boundaries of decision regions within the space spanned by the inputs.

In conventional networks, the response $\Omega_i$ of a node i receiving j inputs, the jth input to node i represented by the value $I_{ij}$ is according to the following sigmoidal function:

$$\Omega_i = 1 / \left[ 1 + \exp\left[ \left( -\gamma \sum_j W_{ij} * I_{ij} \right) + T_0 \right] \right]$$

where $W_{ij}$ is the weighting factor for the jth input to the node i. The constant $\gamma$ is a gain constant in the range of 0.0 to 1.0, and the constant $T_0$ is a threshold value for the sigmoidal function.

In order for a network 40 to solve a problem such as a classification problem, the weighting factors $W_{ij}$ for the nodes must first be set to proper values according to the problem to be solved. This training procedure for networks 40 is done by presenting inputs with known desired results to the network. The output of the network is compared against the desired result, and an operation which backpropagates error information from the output nodes 46 toward the input nodes 42 is used to correct the weighting factors $W_{ij}$ according to this error information. The change in the weighting factors effectively allows each of the nodes 42, 44, 46 to ignore (relatively) the inputs from certain of the nodes providing it inputs, and to follow others of the inputs. The backpropagation is done according to the well-known generalized delta rule, which may be expressed for network 40 operating according to the above equation for $\Omega_i$ as follows:

$$W_{ij}(t+1) = W_{ij}(t) + \beta \epsilon_i I_{ij} + \mu[W_{ij}(t) - W_{ij}(t-1)]$$

where $\beta$ is a learning constant normally in the range from 0.0 to 1.0, and where $\mu$ is a momentum constant also normally in the range from 0.0 to 1.0. The value $\epsilon_i$ is an error term defined, for an output node 46, by:

$$\epsilon_i = \Omega_i(1-\Omega_i)(D_i-\Omega_i)$$

where $D_i$ is the desired output for the input presented. The error term $\epsilon_i$ for a hidden node 44 is defined by:

$\epsilon_i = \Omega_i(1-\Omega_i)\Sigma_k \epsilon_k \Omega_k$; k being all nodes in the layers above the hidden node 44

The application of the generalized delta rule to adjust the weighting factors $W_{ij}$ in network 40 is an iterative process, both iterative toward converging the error to within a certain tolerable limit for a given input example, and iterative for multiple examples. As indicated above, this iterative process may require tens of thousands or hundreds of thousands of iterations for a moderately complex problem.

Figure 4:
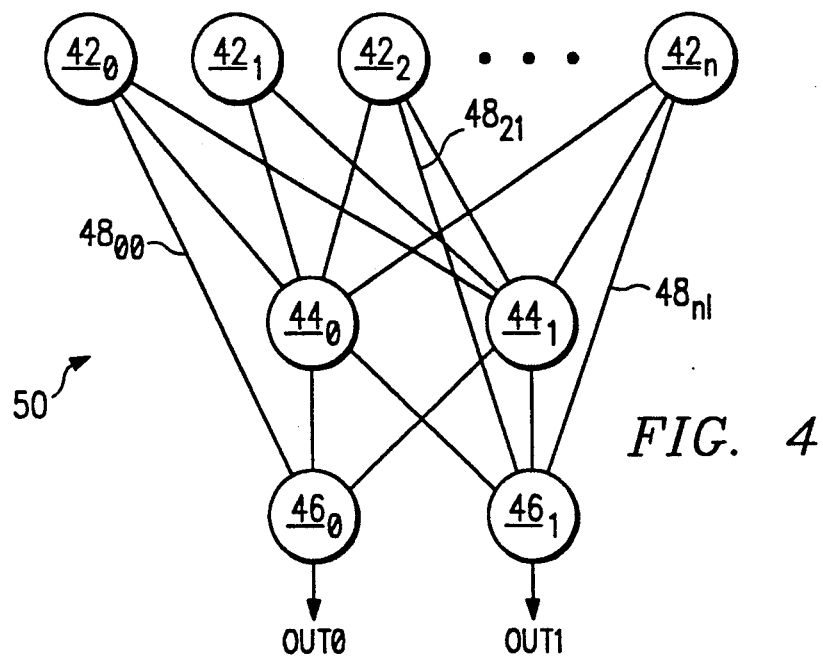
FIG. 4 is a representational diagram of a neural network according to a preferred embodiment of the invention.

Referring now to FIG. 4, a neural network 50 according to a preferred embodiment of the invention is representationally illustrated. As in the prior case, network 50 may be implemented in a computer program in conventional computing equipment or, as depends upon the network needs relative to the available technology, may be implemented in dedicated neural network hardware.

Network 50 of FIG. 4 includes input nodes 42, hidden layer nodes 44, and output nodes 46, as in the conventional network 40 of FIG. 3. Besides the links from input nodes 42 to hidden layer nodes 44, and the links from hidden layer nodes 44 to output nodes 46, as present in network 40 of FIG. 3, network 50 includes links 48 which directly connect input nodes 42 to output nodes 46. In FIG. 4, examples of such links 48 include link $48_{00}$ from input node $42_0$ to output node $46_0$, link $48_{21}$ from input node $42_2$ to output node $46_1$, and link $48_{n1}$ from input node $42_n$ to output node $46_1$. While it is illustrated that not all input nodes 42 may have links 48 to either or both of output nodes 46, it is of course contemplated that such full connection of links 48 may be utilized.

The network 50 of FIG. 4 provides significant advantages over the prior network arrangement 40 of FIG. 3. Firstly, provision of such links 48 allows for more rapid convergence during training of the network 50, since a higher degree of connectivity is provided within network 50. For example, if an output node 46 is strongly dependent upon one particular input node 42, a direct link 48 therebetween allows more rapid convergence to the proper weighting according to this dependence, rather than going through a "filter" of the hidden layer of nodes 44 to arrive at the proper result. This improved training convergence is especially apparent considering that the conventional network 40 has only a limited set of weighting factors $W_{ij}$ which provide an accurate solution. Provision of links 48 as in network 50 enlarges the potential number of sets of weighting factors $W_{ij}$ which provide an acceptable solution, and thus allows more rapid convergence to an acceptable set.

In addition, during the training procedure, constraints may be inserted which allow for the network 50 to consider such factors as minimization of the number of total links, not merely links 48. Reduction of the number of links in network 50, which is enabled by providing links 48 which skip the hidden layer of nodes 44 for some nodes, will not only reduce the training time of the network 50, but will also optimize the performance of network 50 for its application, for example the recognition problem of seismic trace editing.

The training of network 50 to include links 48 will be described in further detail hereinbelow.

Adaptive Network Operation for Seismic Trace Editing

Referring now to FIG. 5, a method of using an adaptive network for seismic trace editing according to the preferred embodiment of the invention will now be described in detail. In this method, a seismic survey including multiple shot records such as shown in FIG. 2 will be edited. It is contemplated that the seismic trace editing method described hereinbelow can be readily programmed by one of ordinary skill in the art to run on conventional computing equipment, such programming based upon the description provided herein.

It should be noted that the adaptive network used in the method of FIG. 5 is presumed to have been previously trained, preferably according to the training methods described hereinbelow; it should be noted, however, that conventional backpropagation training of the network may alternatively be utilized in setting the weighting factors $W_{ij}$ of the network. In addition, while network 50 of FIG. 4 is preferred for complex problems such as trace editing, conventional networks such as network 40 of FIG. 3, or indeed a two level network (i.e., without a layer of hidden nodes 44), may alternatively be used, and indeed may be sufficient for the particular seismic trace editing application.

Referring to FIG. 5, the seismic trace editing process begins with the retrieval from memory, in process 52, of the set of weighting factors $W_{ij}$ which were determined for the particular network in the training process. In process 54, the set of data pertaining to the seismic shot record to be analyzed is retrieved from memory. The data retrieved in process 54 corresponds to the amplitudes of each of the traces in the shot record as a function of time. In conventional seismic data analysis, this data generally corresponds to sampled amplitudes of the vibrations detected by geophone groups P over time. A preferred sampling period for this embodiment is on the order of 2 to 4 msec. As is well known in the art, sampling may be used in the vibration detection at geophone groups P, or analog signals may be generated by geophone groups P which are subsequently sampled and stored in memory in a manner corresponding to the sample time.

It should be noted that, given enough nodes and sufficient training, a neural network would be capable of classifying groups of data such as would be presented by a direct bit-mapped representation of the shot record, or alternatively with data corresponding to the value of the amplitude of each trace at each sampling time. For a shot record having similar size and resolution as shown in FIG. 2, which is displayable (and mapped into) a field having 1000 or more picture elements (pixels) on a side, use of the bit-mapped graphics information as inputs to the network would provide more than one million inputs to the same number of input nodes 42 in the network. Such a network would be unwieldy to operate and to train, consuming a large amount of computing time for each operation. It has been found that seismic trace editing may be done, on a trace by trace basis, with many fewer inputs, and resulting in successful and consistent editing. Accordingly, it is preferable to process the shot record data prior to its presentation to the network, so that the efficiency of the process can be increased.

According to this embodiment of the method, the seismic data is presented to the network on substantially a trace-by-trace basis, and in a compressed form from that of the raw sample amplitudes as a function of time. Process 56 incorporates a number of calculations to arrive at such a form for the data. A first calculation performed in process 56 on each of the seismic traces is a Fourier transform of the time-domain data (as shown in the shot record of FIG. 2) into the frequency domain. Such a Fourier transform is preferably performed according to conventional techniques, such as a Discrete Fast Fourier Transform (DFFT), as is well known in the art. The DFFT in this method is performed on a trace-by-trace basis, so that an amplitude spectrum in the frequency domain is generated and stored for each of the seismic traces in the shot record, taken over the range of time of interest. In this embodiment of the invention, the result of the DFFT provides 128 amplitude values, taken at 128 frequency samples of the amplitude spectrum, in a range from DC to the Nyquist frequency of the amplitude spectrum (i.e., the highest frequency of interest, having an upper limit of one-half the sampling frequency).

In addition, after the DFFT is performed, other attributes are also preferably calculated for each of the seismic traces, for later presentation to the adaptive network. These attributes include statistics and other parameters of the mathematical representations of the seismic data. While many such statistics and parameters are well known in the art, or may be derived for such data, the attributes which are preferred in this embodiment of the invention include the following:

decay rate of the seismic trace (i.e., the ratio of the average energies of the first and last halves of the time-domain seismic trace);
  average absolute peak amplitude of the trace (in the time domain);
  average energy over the full trace;
  average frequency of the full trace;
  ratio of largest peak amplitude in the trace (in the time domain) to the second largest peak amplitude;
  maximum crosscorrelation; and
  ratio of average energy over the trace to the average trace energy of the two adjacent traces.

Each of these attributes are well-known seismic trace attributes, and are easily calculated according to conventional methods. It should be noted that first five attributes listed are directed solely to the trace of interest, with the last two attributes also directed to the traces neighboring the trace of interest. Other attributes which may be presented to the network include the integral of the trace energy over time, and instantaneous trace attributes such as amplitude, phase, frequency and the like, as a function of time.

Figure 6:
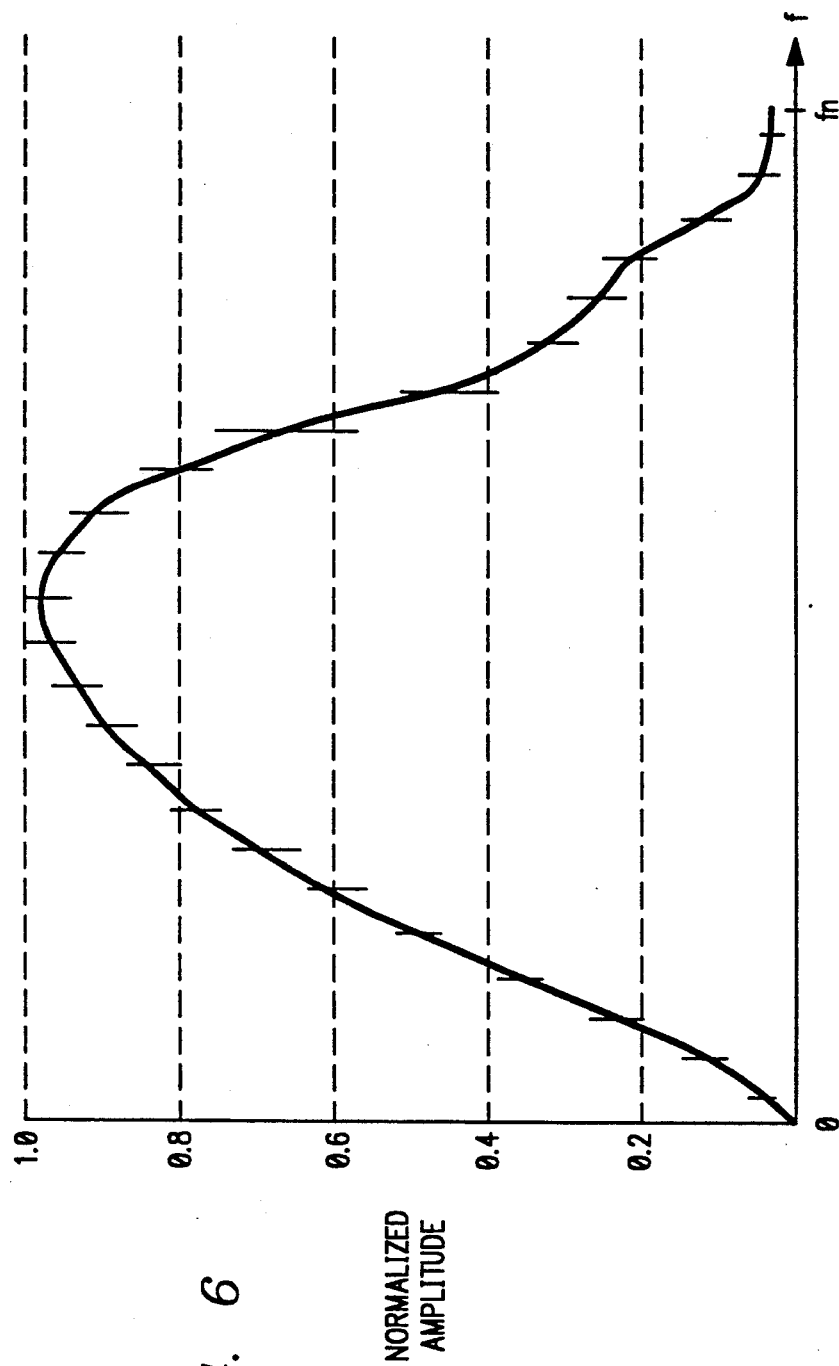
FIG. 6 illustrates an amplitude spectrum in the frequency domain of a seismic trace, and a digital discretization thereof according to the preferred embodiment of the invention.

Following the calculation of the DFFT and the other attributes, digital discretization of the amplitude spectrum in the frequency domain is performed. This discretization is intended to further reduce the number of inputs to the network to a manageable number, but which retains the graphical shape of the amplitude spectrum as an input to the network in sufficient detail as to provide an adequate result. Referring to FIG. 6, this discretization will be described in detail, relative to a typical amplitude spectrum for a seismic trace, which is determined by the performing of the DFFT algorithm on the sampled seismic trace amplitudes in the time domain.

According to this embodiment of the invention, the information which is presented to the adaptive network for seismic trace editing includes graphics data corresponding to the seismic trace as it would be viewed by a human operator at a display terminal. As is well known, displays for conventional computer systems are generally bit-mapped displays, where a portion of computer memory stores, in digital form, the data to be displayed on a computer screen (or sent to a plotter) in a position-by-position representation. Conventional video displays are organized by picture elements, or pixels; in a monochrome display system, for example, the bit-mapped memory will store a "1" state for each pixel that is to be bright, and a "0" state for each pixel that is to be dark. In such an arrangement, the video display is generated by reading the bit-mapped memory, line by line, and energizing or not energizing each pixel according to the data state stored in memory at the corresponding location.

The number of pixels required for the display of a shot record such as FIG. 2 is quite large, especially considering the resolution of the individual traces. For a display size on the order of 1024 by 1024 pixels, as is conventional for high-resolution workstation displays, the assignment of one input node 42 in the adaptive network for each pixel would thus require over one million input nodes. Even in the display of a single amplitude spectrum (as shown in FIG. 6), more inputs than are necessary are provided by a bit-mapped graphical display thereof. It has been found that good results may be obtained in identifying good and bad seismic traces without requiring an input node 42 for each pixel of the display, using an adaptive network such as network 50, and indeed simpler networks such as a two-layer network, with far fewer nodes (e.g., on the order of 519 input nodes, as will be described hereinbelow). Accordingly, since it is not necessary to have individual pixel resolution in order to adequately classify seismic traces as acceptable or not acceptable from a noise standpoint, and since the network size would be unmanageably large at full resolution, the method according to this embodiment of the invention uses a graphical estimate of the shot record in classifying each trace. In order to reduce the number of input nodes 42, the preferred embodiment of the invention performs a digital discretization of the graphical display of the amplitude spectrum.

As noted hereinabove, the result of the DFFT provides an amplitude value for each of a number of frequency samples. Referring to FIG. 6, an amplitude spectrum is illustrated, having sampled amplitudes at twenty-four frequencies between zero (DC) and the Nyquist frequency $f_h$, for purposes of explanation; as noted hereinabove, according to the preferred method of the invention, each amplitude spectrum would have values for 128 frequency samples. In performing the digital discretization for a seismic trace, the amplitudes at the sampled frequencies are retrieved from memory and normalized, with the highest amplitude set to the value 1.0. To arrive at the digital discretization, the range of amplitudes between 0.0 and 1.0 are divided, in this embodiment, into five categories, with a digital value assigned to each as follows:

0.000 to 0.199:0000
0.200 to 0.399:1000
0.400 to 0.599:1100
0.600 to 0.799:1110
0.800 to 1.000:1111

The particular four bit value is selected so as to graphically represent, with less resolution, the amplitude spectrum in the frequency domain for each seismic trace in the shot record, in a coarser manner than shown in the spectrum itself, and where the zero amplitude line is at the left hand side of the discretized estimate.

Referring to FIG. 6, each of the amplitudes at each of the twenty-four sample frequencies has been discretized according to the above grouping, and represented by the four bit value. For example, frequency samples 1 and 2 have amplitudes below 0.200, and accordingly their discretized value is 0000. The amplitude of frequency samples 3 and 5 range between 0.200 and 0.400, and accordingly the discretized value of 1000 is assigned thereto. Similarly, sample 5 receives the discretized value 1100, with samples 6 through 8 receiving the discretized value 1110. The amplitude of each of samples 9 through 16 is between the value of 0.800 and 1.000, and accordingly the discretized value of 1111 is assigned to each. Similar assignment is performed for the samples on the falling side of the spectrum, i.e., for frequency samples 17 through 24. As a result, the digital discretization performed by this method provides a coarse graphical representation of the amplitude spectrum in the frequency domain. With 128 sample frequencies, as described above, each discretized into a four-bit value, 512 input bits are determined, each of which will be presented to an input node of the network.

It should be noted that process 56 calculates the DFFT, and process 58 discretizes the same, for each seismic trace in the shot record under analysis; alternatively, process 56 and 58 may be performed for each trace individually, in conjunction with its analysis by the adaptive network. In order to calculate the ratio of average energy of a trace to the average trace energy of its two adjacent traces, of course, the attribute of average trace energy must be calculated; accordingly, it is advantageous to perform process 56 for all traces in the shot record, rather than to perform each individually as analyzed. Furthermore, it should be noted that the seismic analysis performed after the editing of this invention will generally utilize the higher resolution time domain sampled data, from which the DFFT, and its digital discretization, are derived. Accordingly, it is advantageous to calculate the DFFT and other attributes during the editing method of FIG. 6, retaining the raw data for later analysis, rather than perform and store the same for the shot record in lieu of the actual raw time domain sampled data.

Figure 7:
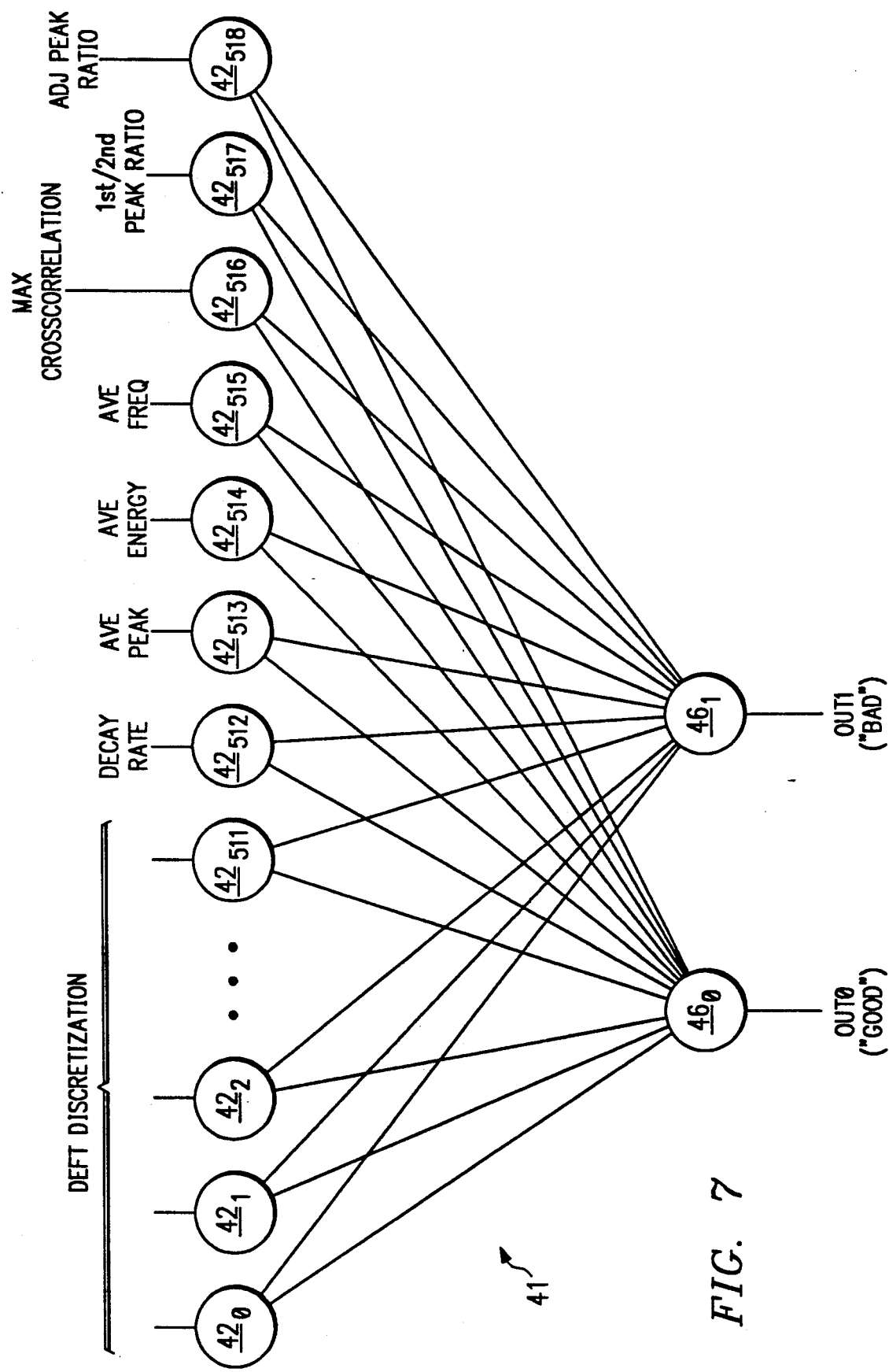
FIG. 7 is a representational diagram of a two-layer adaptive network, indicating the inputs and outputs thereof for the seismic trace editing method of the preferred embodiment of the invention.

After the discretization is performed of the DFFT amplitude spectrum in process 58, the analysis of each of the traces in a shot record can proceed. Process 59 sets the value of the initial trace to be analyzed. In process 60, the values determined in processes 56 and 58 for the trace under analysis are retrieved from memory and presented to the network. Referring to FIG. 7, the construction of a two-layer network 41 is illustrated as receiving these inputs. The four bit discretization values for each of 128 frequencies are presented to input nodes $42_0$ through $42_{511}$ of the network, with one input node 42 assigned to each bit of the discretization (thus requiring 512 input nodes for receiving the discretized DFFT information). The seven attribute values described hereinabove are each presented to a single input node 42 assigned thereto. Accordingly, the network 41 of FIG. 7 has 519 input nodes 42.

While not shown in FIG. 7, network 41 may include a hidden layer of nodes 44, and include links 48 directly between input nodes 42 and output nodes 46, as in network 50 of FIG. 4. As will be described hereinbelow relative to the training method, such a configuration for the network can result from the network reaching regions of slow convergence.

Network 41 according to this embodiment of the invention also includes two output nodes 46. Output node $46_0$ is for presenting on line OUT0 the value 1.000 for those traces classified by the network 41 as "good" traces, i.e., traces with useable seismic data therein, and for presenting on line OUT0 the value 0.000 for those traces which are too noisy for proper analysis (i.e., "bad" traces). Conversely, output node 46 ideally presents, on line OUT1, the value 1.000 for "bad" traces and the value 0.000 for "good" traces. As is well known for neural networks, the actual values presented by outputs OUT0 and OUT1 will generally not match the idealized values of 1 and 0, but will instead be a fractional value between 0.000 and 1.000 at each of the outputs. This is due to the nature of the data presented to the network, and also due to the training of the network stopping at a point where the error presented by the network is within a tolerable level. Accordingly, the indication of a "good" trace or a "noisy" trace is preferably identified by the network presenting an output which meets a certain criteria. An example of a simple criteria is to identify a noisy trace when the value presented by output node 46 (OUT1) is greater than the value presented by output node 46$_0$ (OUT0). Alternatively, a tolerance limit may be used as the first break criteria. For example, a noisy trace may be defined as that for which the output OUT1 is 0.800 or greater and for which OUT0 is 0.200 or less. Also as is well known in the art, the difference between the actual output and the ideal output may be used to define confidence factors, i.e., a measurement of the confidence in the value determined by the network 41.

After network 41 has indicated its results on lines OUT0 and OUT1, process 62 of the method of FIG. 6 according to this preferred embodiment of the invention stores the results of the classification in memory, with the result for each trace stored in a manner identified with its trace. During subsequent processing, these results stored in process 62 are preferably interrogated, and inclusion or exclusion of the trace associated therewith from the seismic analysis performed accordingly. Alternatively, the raw data for the trace may be deleted from memory, if the result presented by network 41 indicate that the trace is noisy; this will conserve memory to the highest degree, such that only those traces are retained which include useful and retrievable seismic data.

In test 64, the trace under analysis is matched against the last trace (or maximum count number MAX), to determine if the editing for the particular shot record is complete. If more traces remain to be analyzed by network 41, process 66 increments the counter of the trace, and the inputs for the next trace corresponding to the digitally discretized DFFT amplitude spectrum, and the other attributes of the trace, are again presented to the network 41 for classification. If the last trace has been analyzed (i.e., the result of test 64 is YES), test 68 determines if additional shot records are to be analyzed. If so, process 54 retrieves the shot record data for the next shot record in the survey (i.e., process 69 increments the shot record number) and the process continues.

Referring to FIG. 2, the results of a shot record can be seen by the designations of lower case "g" for a good trace found by a network such as network 41 of FIG. 7, with the inputs described hereinabove, and by the designation of lower case "b" for the bade trace T$_{15}$ found thereby (the upper case "G" and "B" designated traces identify the good and bad traces used in training, as will be described in further detail hereinbelow). As a result, a large amount of manual analysis can be performed in an automated fashion by an adaptive network receiving the inputs and performing the preferred embodiment of the method as described hereinabove.

Adaptive Network Training

The preferred methods of training a network such as networks 40, 41 and 50 to perform the above-described process, and other similar processes, will now be described in detail. As is evident from the description hereinabove, the network used according to the method of FIG. 6 must previously be "trained", i.e., the weighting factors $W_{ij}$ of the network must be set, so that the output appearing at nodes 46 corresponds closely to the true classification of the input data set applied to nodes 42. As is well known, adaptive, or neural, networks are particularly useful in the problems of recognizing and classifying input data sets which were previously not presented thereto, assuming that the weighting factors are properly assigned.

Figure 8:
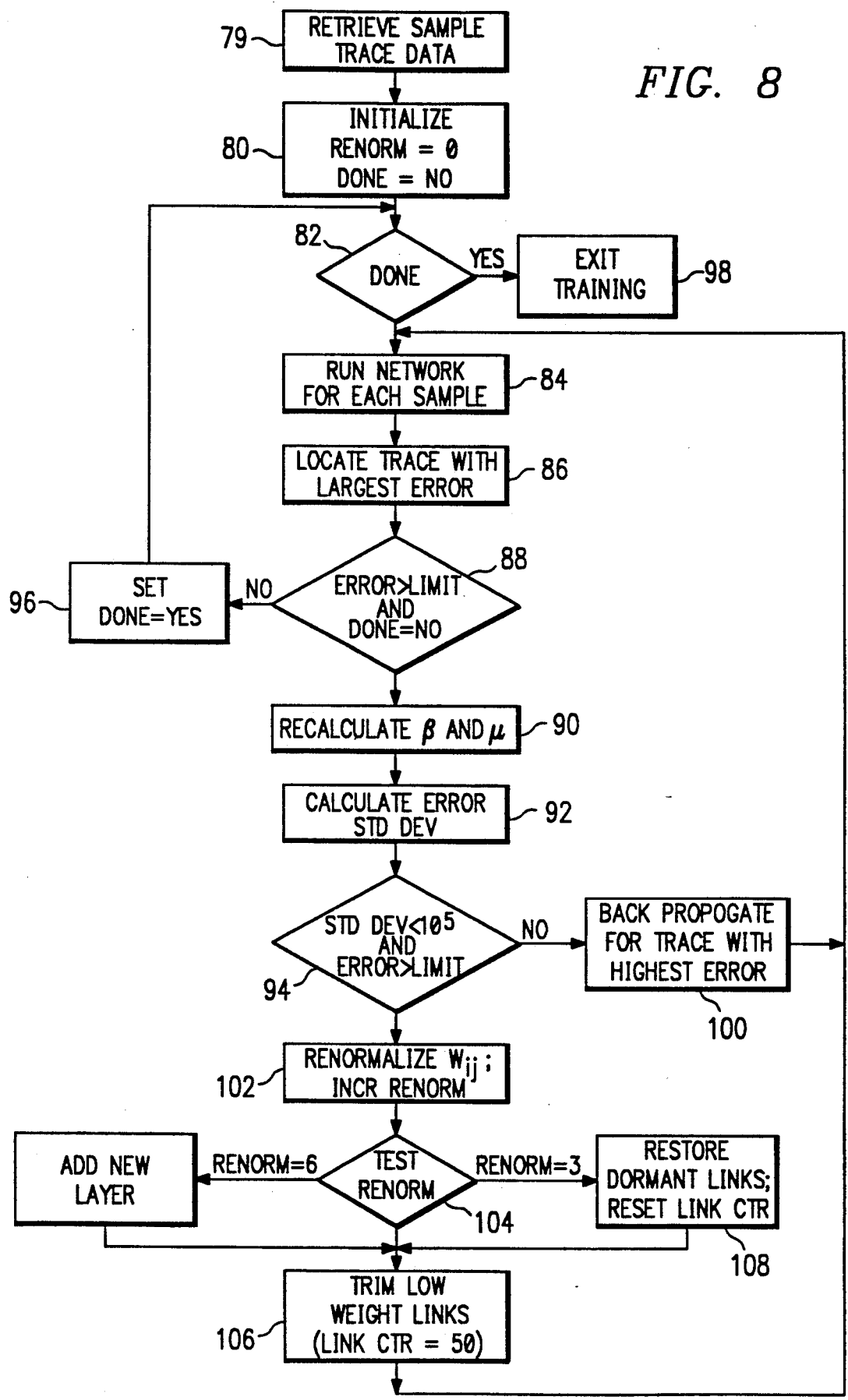
FIG. 8 is a flow diagram of a method of training an adaptive network according to the preferred embodiment of the invention.

Referring now to FIG. 8, a flow diagram for the preferred method of training network 50 of FIG. 4 will now be described. It is contemplated that the training method described hereinbelow can be readily programmed by one of ordinary skill in the art to run on conventional computing equipment from the description provided herein. Prior to the running of a computer program to set the weighting factors $W_{ij}$, as described hereinabove, certain sample inputs and outputs must be provided, such samples preferably manually selected. For the seismic trace editing application, this is preferably done by an operator viewing a shot record, such as the common source gather of FIG. 2, and indicating whether or not the traces are good or bad, based upon the skill and experience of the operator. For best results, it is preferable that more than one traces of each type are identified by the operator. Referring to FIG. 2, the traces identified as good traces prior to training are indicated by the upper case "G", and those identified as bad, or noisy, traces are identified by the upper case "B".

This review and identification of training examples is preferably done at a workstation, for example a DEC Workstation 3100, with the indication of the sample traces and their classification made by the operator setting a cursor on a trace of interest, and indicating the proper classification to the workstation by way of a keystroke or mouse button. After identifying and classifying the sample traces, the operator can initiate the training program.

The training method begins in process 79 with the first portion of the data retrieval and processing steps of the method of FIG. 6. In order for the training to be effective, data of similar form must be presented in training as that which will be presented in actual operation. Accordingly, process 79 consists of process 54 through 58 of FIG. 5, for the sample traces identified by the operator. Accordingly, memory of the computer will store the discretized DFFT results, and the other attributes described hereinabove, for the sample traces identified by the operator.

Process 80 is then performed, initializing certain parameters, including a renormalization counter RENORM which is initialized to the value 0, a DONE flag which is initialized to the value NO, and also the set of weighting factors $W_{ij}$ which are preferably set to random values in a limited range, for example between +0.25 and −0.25. It should also be noted that the initial network configuration selected at this point at the beginning of the training process is a two layer network, with the number of input nodes 42 corresponding to the number of bits of discretized digital data and attribute to be analyzed (519 bits in the example described hereinabove), with two output nodes 46 for selecting the two outputs discussed hereinabove for indicating the classification of the trace, with no hidden layer nodes 44. As will be described hereinbelow, additional layers may be added according to this embodiment of the method, if the training reaches a "slow convergence region".

A serious problem for backpropagation neural networks is the possibility that the training may reach a state commonly referred to as a slow convergence region. A first example of a slow convergence region is trapping in a local minimum, where incremental change of the weighting factors in any direction increases the error, but where the network error is not at its lowest, or global, minimum. Another example of a slow convergence region is a region where the error gradient is exceedingly low (i.e., change in the weighting factors reduces the error only by an insignificant amount). Such local minimum trapping, low error gradient regions, and the like will be hereinafter referred to cumulatively as "slow convergence regions".

Decision block 82 checks the status of the DONE flag, exiting the training program if it has been set to YES. Since DONE is set to NO, the training will begin from process 84. At process 84, a run is performed by the network for each of the identified sample traces. FIG. 9 is a flow diagram, illustrating the operation of this portion of the training method in further detail. Process 84 first sets a counter S to the value 1 to operate on the first sample trace $T_s$ (a maximum value MAX is previously set, for example in initialization process 80, to the number of sample traces identified by the operator). For this embodiment, where the network is to classify the trace as good or bad, based on the noise present on the trace, the discretized data corresponding to the DFFT of sample trace $T_s$, and the attribute data described hereinabove, is retrieved in process 93. The discretized data are presented to input nodes 42 of the network in process 95, in similar fashion as described hereinabove. The network, in its initial condition, operates on these inputs, and provides an output based on its weighting factors $W_{ij}$ as currently set. As a result of the operation of the network, values are presented by output nodes 46, corresponding to outputs OUT0 and OUT1. The values generated at output nodes 46 will generally consist of a fractional value, i.e., ranging between 0.000 and 1.000.

The desired output for the sample trace $T_s$ depends, of course, on how the operator classified the trace. For a good sample trace, such as trace $T_{31}$ of FIG. 2, the desired outputs are the value 1.000 for OUT0 and the value 0.000 for OUT1. The difference between the actual values of outputs OUT0 and OUT1 and these desired values, i.e., the error for each output node, is calculated in process 99 and stored in memory in a manner associated with sample trace $T_s$. In this embodiment of the invention, the cumulative error (i.e., the sum of the differences for OUT0 and OUT1) is also of interest, and is also stored.

In decision 101, the value of the counter S is compared against the value MAX, to determine if all sample traces $T_s$ have been run through the network. If all sample traces $T_s$ have not been run through the network, the counter S is incremented, and the set of discretized and attribute data for the new trace $T_s$ is retrieved and input to the network, beginning with process 93. If the value of counter S indicates that all sample traces $T_s$ have been run, the training process continues with process 86 of FIG. 8.

Process 86 begins a portion of the training method which is directed to the incremental training of the network. Conventional backpropagation methods for training adaptive networks apply a set of training examples to the network, such training examples corresponding to the sample traces $T_s$ in this method. In the conventional method, each training case is applied to the network, with the backpropagation adjustment of the weighting factors $W_{ij}$ performed after each run, until the error for the particular training case is below the tolerance limit. The next training example is then applied to the network, with backpropagation adjustment of the weighting factors $W_{ij}$ performed until the error for this training example is below the tolerance limit. The procedure of backpropagation for each training example continues for the training examples available.

Significant inefficiency in training according to such conventional backpropagation is overcome by the incremental training method according to this embodiment of the invention. The inefficiency in the conventional method results from its attempt to go from a highly disordered random initial state for the network to a highly ordered final solution space, in a relatively random manner (i.e., dependent upon the arbitrary order in which the training examples are presented to the network). In contrast, the method according to this embodiment of the invention locates the training example with the highest error, applies it to the network and performs the backpropagation accordingly. All sample traces $T_s$ are then run according to the adjusted network, the largest error is compared against the limit, followed by backpropagation of the worst sample trace $T_s$, until the error for the worst sample is within the tolerance limit.

Referring to FIG. 8, process 86 retrieves the error values calculated from the runs of process 84 on each of the sample traces $T_s$, and locates the sample trace $T_s$ with the highest error. In decision 88, this highest error is compared against the tolerance limit; if the highest error is below the tolerance limit, the flag DONE is set to YES in process 96, and the training is exited via decision 82 and process 98. If the highest sample trace error is above the tolerance limit, the backpropagation process according to this embodiment of the invention will be performed for this sample trace $T_s$.

As described hereinabove, the generalized delta rule as used for backpropagation includes a learning factor $\beta$ and a momentum factor $\mu$. In prior backpropagation methods, these two constants have been experimentally determined for particular network types prior to the training process, and held constant at these values throughout the training process. However, it has been found that the determination of optimal values for these factors prior to the training process is relatively difficult, as the optimum value can vary depending upon the rate of change of the weighting factors $W_{ij}$ and upon the particular network configuration (which itself changes, according to this embodiment, as will be described in detail hereinbelow). According to this embodiment of the invention, however, process 90 includes a recalculation of these two factors based on the error for the iteration.

In the backpropagation method, the higher the value of $\beta$ and $\mu$, the greater the change in the weighting factors $W_{ij}$ from iteration to iteration. Accordingly, the likelihood of reaching a slow convergence region, such as a local minimum, increases with higher values of these factors, but the rate of convergence decreases with lower values of these factors. According to this embodiment of the invention, the learning factor $\beta$ is set to a low value when the error is high, to avoid slow convergence regions. Conversely, as the error value is relatively low, the value of the learning factor $\beta$ may be set quite high, since the likelihood of reaching a slow convergence region is relatively low when the network is close to its desired state. In this embodiment of the invention, the momentum factor is set according to a time-averaged function of $\beta$, as will be described in detail hereinbelow, such that the momentum factor $\mu$ will have a large value once the learning factor $\beta$ has reached a stable large value. Higher values of factors $\beta$ and $\mu$ also allow for rapid convergence in the situation where the error is low (and where change in the weighting factors becomes very small from iteration to iteration).

The value of the learning factor $\beta$ is calculated in process 90 in this embodiment of the invention as follows:

$$\beta = [1 - (\text{maximum output node error})]$$

The current momentum factor $\mu$ is calculated based on the current learning factor $\beta$, and on the previous momentum factor value $\mu_{prev}$, as follows:

if $\mu_{prev} > \beta$:

$$\mu = [2\mu_{prev} + \beta]/3$$

If $\mu_{prev} \leq \beta$:

$$\mu = [2\beta + \mu_{prev}]/3$$

It should be noted that the quantity subtracted from unity in the above calculation of learning factor $\beta$ is not the total error for the worst sample trace $T_s$ (which is the sum of the errors of the output nodes 46), but is the higher of the errors for the two output nodes 46 in the network according to this embodiment. This is because the sum of the errors could cause the learning factor $\beta$ to become negative, making the backpropagation erroneous.

Therefore, the method according to this embodiment of the invention performs dynamic adjustment of the learning and momentum factors $\beta$ and $\mu$, so that the learning rate (i.e., the rate at which the weighting factors $W_{ij}$ are changed from iteration to iteration) is relatively low when output node error is high, thus reducing the likelihood that the backpropagation will reach a slow convergence region. Once the output error becomes low, the learning rate increases so that convergence to an acceptable error limit occurs faster for those cases where slow convergence is less likely (i.e., the current result is close to the desired result). This dynamic adjustment of the factors $\beta$ and $\mu$ thus improves the backpropagation efficiency not only in the incremental training method of this embodiment of the invention, but also in conventional backpropagation methods as well.

The training method according to this embodiment of the invention next determines if the training has reached a slow convergence region. As will be described in further detail hereinbelow, this method includes steps for escaping a slow convergence region. Process 92 calculates the standard deviation of the error value for the worst sample trace $T_s$ over the most recent runs of process 84, for example over the last twenty runs. If the standard deviation of the error is extremely small, for example below $10^{-5}$, but the error is still above the tolerance limit (i.e., the result of decision 88 is NO), it may be concluded that the network is in a slow convergence region, converging on an incorrect set of weighting factors $W_{ij}$ (in the case of a local minimum), or converging at an infinitesimal rate. As noted above, the methods for escaping such a situation will be described in further detail hereinbelow.

If the network is not in a slow convergence region, backpropagation with the new values of factors $\beta$ and $\mu$ will now be performed for the network according to the results of the sample trace $T_s$ with the worst error. This is performed in process 100 according to the well-known generalized delta rule, as described above. In this embodiment of the invention, process 100 preferably calculates the error terms, for purposes of backpropagation, differently than the conventional backpropagation method.

As described hereinabove, conventional adjustment of the weighting factors is performed as follows:

$$W_{ij}(t+1) = W_{ij}(t) + \beta \epsilon_i I_{ij} + \mu [W_{ij}(t) - W_{ij}(t-1)]$$

where $\epsilon_i$ is an error term defined, for an output node 46, by:

$$\epsilon_i = \Omega_i(1 - \Omega_i)(D_i - \Omega_i)$$

where $D_i$ is the desired output for the input presented. According to the conventional backpropagation method for the example of a good sample trace, the desired output is 1.00 for OUT0 and 0.00 for OUT1. It has been observed, however, that this setting of the desired outputs $D_i$ encourages some of the weighting factors $W_{ij}$ to grow to large values during the iterative training process. A wide disparity in the weighting factors $W_{ij}$, caused by certain of the weighting factors $W_{ij}$ being very large, results in slow convergence. Such slow convergence especially affects the incremental training approach of this embodiment of the invention, where the network is trained according to the worst sample case first. Accordingly, in this embodiment of the invention, the desired outputs $D_i$ are not set to their true value during the application of the generalized delta rule, but are set to less extreme values. For example, the desired output $D_0$ for OUT0 may be set to 0.800, and the desired output $D_1$ for OUT1 may be set to 0.200. This adjustment of the desired outputs $D_i$ for the generalized delta rule backpropagation has been observed to also improve the efficiency of the network in reaching convergence.

After the backpropagation of process 100 which recalculates the weighting factors $W_{ij}$, the weighting factors $W_{ij}$ are stored in memory, and the method continues with the next iteration of process 84, performed on all sample traces $T_s$ with the new weighting factors $W_{ij}$ adjusted based upon the worst sample trace. If the network does not enter a slow convergence region, the above-described processes will be iteratively repeated until the highest sample trace error is below the tolerance limit (i.e., the result of decision 88 is NO), in which case the training method will be complete.

According to this incremental training approach, significant improvement in training efficiency may be obtained. Since the backpropagation is performed for the sample trace $T_s$ with the highest error after each set of runs in process 84, the training method tends not to perform time-consuming backpropagation based upon sample traces $T_s$ that have low error, as such traces do not adjust the weighting factors $W_{ij}$ to a significant degree. The adjustment of the weighting factors $W_{ij}$ for one of the traces will tend to apply to other sample traces $T_s$ which resemble the first, such as all good sample traces, and accordingly redundant backpropagation is not performed. Furthermore, the incremental training method according to this invention presents higher error cases to the network more frequently than small error cases, which further reduces convergence time.

Returning to FIG. 8, if a slow convergence region is detected in decision 94, the training method according to this embodiment of the invention includes a number of techniques for escaping the slow convergence region. A first technique is the renormalization of all weighting factors $W_{ij}$.

It has been observed that the likelihood of reaching a slow convergence region is increased by certain conditions in the set of weighting factors $W_{ij}$. These conditions include the state where certain of the weighting factors $W_{ij}$ have reached an excessively large value, and also include the state where one or more of the weighting factors $W_{ij}$ oscillate between two values on successive iterations. According to this embodiment of the invention, process 102 normalizes all of the weighting factors $W_{ij}$ to within a small range, for example to within a range of 0.500 from least to greatest value, with the relative values of the weighting factors $W_{ij}$ retained, but within a smaller range. Process 102 also increments the value of the renormalization counter RENORM by one, so that further, more drastic, steps may be taken later if the renormalization of process 102 is unsuccessful.

Decision 104 then tests the value of the counter RENORM. If the value is neither three or six, in this embodiment (indicating neither the third or sixth renormalization), the more drastic steps are not taken at this time. Process 106 is then performed in this embodiment, where links in the network which have retained low weights are cut.

It has been found that for certain problems, such as seismic trace editing, a number of links within the network will have low weighting factors $W_{ij}$ for a number of iterations. Performing the backpropagation process for such weighting factors, with no adjustment resulting therefrom, is quite inefficient. Accordingly, process 106 retrieves the set of weighting factors $W_{ij}$ for the network, and determines which (if any) of the weighting factors $W_{ij}$ are below a certain threshold value (for example, below 0.001). If an individual weighting factor $W_{ij}$ is below the threshold value, a link counter for this factor is interrogated. If the value of the link counter is at or above a limit, such as fifty, process 106 sets the value of the weighting factor to zero, and eliminates it from further adjustment via backpropagation.

It should be noted that the link counter is preferably incremented during the backpropagation process 100, as the number of times that process 106 is performed depends upon the number of times that the network reaches a slow convergence region. It should also be noted that, if the backpropagation of process 100 establishes a value for a weighting factor $W_{ij}$ which is greater than the threshold limit, the link counter should be reset to zero, as it is preferred that the link be trimmed only if it has been excessively low for a number of consecutive iterations.

The trimming of such dormant links, i.e., those with continually low values, has been found to greatly improve the training efficiency of the method according to this embodiment of the invention. In addition, while process 106 for trimming dormant links is performed after renormalization of process 102 when a slow convergence region is detected, alternatively the link trimming of process 106 could be performed immediately after the backpropagation of process 100, or at some other time in the major loop of the flow of FIG. 8.

After the renormalization of the weighting factors $W_{ij}$ of the network, and the trimming of dormant links (if any) of process 106, the training method of this embodiment of the invention continues for new runs of the network for the sample traces $T_s$ in process 84. If the renormalization of weighting factors $W_{ij}$ was successful in dislodging the network from the slow convergence region, the training will result in convergence at the proper set of values for weighting factors $W_{ij}$.

However, if merely the renormalization of process 102 is insufficient to cause escape from the slow convergence region, i.e., if the result of decision 94 remains YES for two passes, the value of the RENORM counter will equal three. The result of decision 104 which tests the value of the counter RENORM will cause the method of this embodiment of the invention to perform the restoration of previously trimmed links in process 108. It may be possible that the link trimming of process 106, if done prematurely for some links, may have reduced the complexity of the network to a level below that necessary to converge on the proper solution, so that the network reaches a slow convergence region. Accordingly, process 108 (on the third renormalization of weighting factors $W_{ij}$) restores all previously trimmed links to the value of the weighting factor $W_{ij}$ which it last had, and resets the link counter to zero for these restored links. Control then passes to process 106, where new dormant links are trimmed, and the network returns to process 84 for the next run of sample traces $T_s$.

In the event that numerous renormalization operations and the restoring of dormant links still does not sufficiently adjust the network to avoid the slow convergence region, it is likely that the network is not sufficiently complex to solve the problem of seismic trace editing to within the desired error tolerance (i.e., the least amount of error achievable by the network is too high). As noted hereinabove, the method according to this embodiment of the invention begins with a network which is a two-level network, having only input nodes 42 and two output nodes 46.

If the result of test 104 determines that the counter RENORM has the value of six, indicating that the network has reached a slow convergence region six times, process 110 is performed in which a new layer is added to the network. This is accomplished by adding two new output nodes 46, so that the prior output nodes 46 become hidden layer nodes 44. In addition, as shown for network 50 of FIG. 4 and as described hereinabove, it is preferred that links 48 between each of the input nodes 42 and the new output nodes 46 be established, to provide additional flexibility for the network, and to speed convergence to the proper set of weighting factors $W_{ij}$. After addition of the new layer in process 110, dormant links are again trimmed in process 106, and the training process begins again from process 84.

According to the embodiment of the training method described hereinabove, an adaptive or neural network may be generated which has its organization determined dynamically, as a result of the training process, in which layers may be added as necessary, with links which skip hidden layers in the network, and in which dormant links are trimmed. The resulting network thus quickly is established which is particularly adapted to the classification problem at hand, for example the seismic trace editing problem described hereinabove.

Upon completion of the training process of FIG. 8, the network is ready for the analysis of a full shot record as described hereinabove. It should be noted that, upon the application of a full shot record to the network, the results of the editing may not, in the opinion of the operator, be adequate for one or more traces in the shot record. Accordingly, after performing the analysis of the shot record, it is preferred that the computing equipment be programmed in such a manner that the operator can pick new sample traces $T_s$ in the portions of the shot record where the editing was not as successful as desired, after which training of the network according to the method of FIG. 8 may again be performed. It should be noted that the incremental training method described hereinabove relative to FIG. 8 is especially advantageous for such iterative and interactive training of the network.

Furthermore, as described hereinabove, the ability of the adaptive network, according to the described embodiment of the invention, to perform seismic trace editing provides significant advantages over manual editing. The adaptive training and operation of the neural network provides such editing which is significantly improved both in efficiency and in accuracy. Furthermore, by using the digital discretization of the amplitude spectrum in the frequency domain, as described hereinabove, the operation of the network, both in training and in operation, is more robust and significantly more efficient than if the raw data were applied thereto.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as claimed hereinbelow.

I claim:

1. A method for operating a computer as an adaptive network to classify each of a plurality of seismic traces as useful or noisy, according to noise amplitude of in each trace, each of said traces corresponding to seismic vibrations detected responsive to a seismic source input signal, comprising:
   retrieving stored data representative of a first of said plurality of traces;
   generating a frequency domain amplitude spectrum for said first trace from said retrieved data;
   presenting data from said frequency domain amplitude spectrum to input nodes of said adaptive network, said adaptive network indicating, responsive to said frequency domain amplitude spectrum data, a classification of said first trace as useful or noisy; and
   storing the result of said presenting step.

2. A method of claim 1, further comprising:
   generating a plurality of attributes for said first trace from said retrieved stored data;
   and wherein said presenting step also presents said attributes to input nodes of said adaptive network.

3. The method of claim 2, wherein said retrieved stored data corresponds to time domain amplitudes of said seismic vibrations;
   and wherein said generating step comprises:
      performing a Fast Fourier Transform on said time domain amplitudes to generate said frequency domain amplitude spectrum.

4. The method of claim 3, wherein said generating step further comprises:
   normalizing the amplitudes of said frequency domain amplitude spectrum to within a predetermined range, said frequency domain amplitude spectrum comprising amplitude values at sample frequencies; and
   assigning a digital value to each sample frequency corresponding to the amplitude value of the sample frequency;
   and wherein said presenting step presents said digital value to said input nodes of the adaptive network.

5. The method of claim 2, wherein said attributes correspond to said first trace.

6. The method of claim 2, wherein said retrieving and generating steps are for a plurality of said traces.

7. The method of claim 6, wherein a first of said attributes corresponds to said first trace, and a second of said attributes corresponds to said first trace and a second trace.

8. The method of claim 1, wherein said retrieved stored data corresponds to time domain amplitudes of said seismic vibrations;
   and wherein said generating step comprises:
      performing a Fast Fourier Transform on said time domain amplitudes to generate said frequency domain amplitude spectrum.

9. The method of claim 8, wherein said generating step further comprises:
   normalizing the amplitudes of said frequency domain amplitude spectrum to within a predetermined range, said frequency domain amplitude spectrum comprising amplitude values at sample frequencies; and
   assigning a digital value to each sample frequency corresponding to the amplitude value of the sample frequency;
   and wherein said presenting step presents said digital value to said input nodes of the adaptive network.

10. The method of claim 1, further comprising:
    setting weighting factors in said adaptive network according to a backpropagation method.

11. The method of claim 10, wherein said setting step comprises:
    displaying a sample shot record;
    identifying a useful sample trace and a noisy sample trace;
    generating a frequency domain amplitude spectrum for each of said useful and noisy sample traces;
    presenting data from said frequency domain amplitude spectrum for each of said useful and noisy sample traces to input nodes of said adaptive network, said adaptive network indicating, responsive to said frequency domain amplitude spectrum data and to said weighting factors, values at its output corresponding to classification of each of said useful and noisy sample traces as useful or not useful;

comparing the output of said adaptive network for each of said sample traces with a desired output for each of said useful and noisy sample traces; and adjusting the weighting factors of said adaptive network according to a generalized delta rule and responsive to the result of said comparing step.

12. A method of operating an adaptive network in a computing apparatus, said apparatus including stored data representative of a seismic shot record including a plurality of traces, said stored data corresponding to time domain data for each of said traces, comprising:

retrieving a portion of said stored data corresponding to a plurality of traces;

generating a frequency domain amplitude spectrum for a first trace from said retrieved data;

calculating a first attribute value for said first trace from said retrieved data;

applying data from said frequency domain amplitude spectrum and said first attribute value to a computer program having the form of an adaptive network, said adaptive network generating outputs for indicating whether the trace associated with the data presented to its inputs is useful or is noisy, said indication based upon the setting of adaptive network weighting factors according to the generalized delta rule from sample useful and noisy traces; and storing the outputs of said adaptive network for said first trace.

13. The method of claim 12, wherein said retrieving step retrieves stored data for a plurality of traces; further comprising:

calculating a second attribute for said first trace, said second attribute corresponding to an attribute of said first trace relative to a second trace;

and wherein said applying step also applies data corresponding to said second attribute to inputs of said adaptive network.

14. The method of claim 12, wherein said frequency domain amplitude spectrum comprises a set of discrete amplitude values, each associated with a sample frequency.

15. The method of claim 12, further comprising:

assigning a digital value to each of said sample frequencies in said frequency domain amplitude spectrum, said digital values for said set of discrete amplitude values corresponding to a graphical representation of said frequency domain amplitude spectrum.

16. The method of claim 15, wherein said applying step applies each bit of said digital values to an input node of said adaptive network.

17. The method of claim 12, wherein said calculating step comprises calculating a decay rate for said trace as said first attribute.

18. The method of claim 12, wherein said calculating step comprises calculating said first attribute based on a peak amplitude of said trace.

19. The method of claim 12, wherein said calculating step comprises calculating a maximum cross-correlation value as said first attribute.

20. The method of claim 12, wherein said calculating step comprises calculating an average frequency value as said first attribute.

* * * * *